United States Patent Office 3,002,973
Patented Oct. 3, 1961

3,002,973
6-CHLORO-3-CYCLOALKYL-7-SULFAMYL-1,2,4-BENZOTHIADIAZINE-1,1-DIOXIDES
Harold E. Zaugg, Lake Forest, and Raymond J. Michaels, Jr., Mundelein, Ill., assignors to Abbott Laboratories, North Chicago, Ill., a corporation of Illinois
No Drawing. Continuation of application Ser. No. 777,212, Dec. 1, 1958. This application Jan. 25, 1960, Ser. No. 4,208
4 Claims. (Cl. 260—243)

This invention relates to novel compounds corresponding to the formula

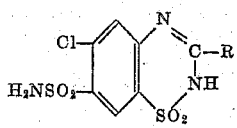

and their non-toxic alkali metal salts. In this and succeeding formulas, R represents cyclopropyl, cyclobutyl, methylcyclopropyl or methylcyclobutyl. These compounds are crystalline solids soluble in many organic solvents but only sparingly soluble in water. They are useful diuretic agents when administered orally or by injection, alone or in combination with conventional pharmaceutical carriers as in the form of a tablet or a sterile solution. The compounds are readily converted to their alkali metal salts by reaction with an aqueous or alcoholic solution of an alkali metal hydroxide such as sodium, potassium or lithium hydroxide. If desired, the alkali metal salt may be isolated by evaporating the solvent.

The new compounds may be prepared by methods well known to organic chemists. In one such method, 5-chloroaniline-2,4-disulfonyl chloride is reacted with a cycloalkylcarbonyl chloride of the formula

The reaction is preferably carried out in the presence of an inert organic solvent such as benzene or carbon tetrachloride. Alternatively, the reaction may be carried out in the absence of a solvent. Good results are obtained when employing one molecular proportion of the disulfonyl chloride with at least one molecular proportion of the cycloalkylcarbonyl chloride. The reaction takes place smoothly at temperature of from 50° C. to the boiling temperature of the reaction mixture. Upon standing or by the addition of a solvent such as pentane, the intermediate N-cycloalkylcarbonyl-5-chloroaniline-2,4-disulfonyl chloride precipitates and is purified by recrystallization from a suitable solvent.

In the second step of the method, the intermediate product having the formula

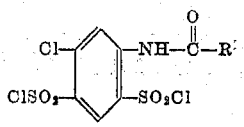

is added portionwise to a stoichiometric excess of liquid ammonia at room temperature. The resulting solution is thereafter evaporated and an aqueous solution of a mineral acid such as sulfuric acid added to the residue until the mixture is strongly acidic. The N-cycloalkylcarbonyl-5-chloro-2,4-disulfamylaniline which precipitates as a crystalline solid is separated and recrystallized from a suitable solvent such as a mixture of ethyl alcohol and water.

In the final step of the method, the disulfamylaniline intermediate having the formula

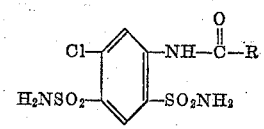

is heated preferably at a temperature of about 200° C. for a period of about 2 hours to split off water and effect closure of the ring to obtain the desired 6-chloro-3-cycloalkyl-7-sulfamyl-1,2,4-benzothiadiazine-1,1-dioxide as a crystalline solid which is separated and purified by recrystallization.

The examples which follow illustrate the invention in detail but are not to be considered as limiting the same to the particular compounds prepared or the methods specifically employed.

EXAMPLE 1

6-chloro-3-cyclopropyl-7-sulfamyl-1,2,4-benzothiadiazine-1,1-dioxide and sodium salt thereof

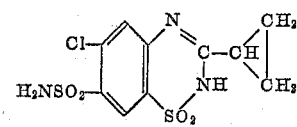

To a solution of 48.7 grams (0.15 mole) of 5-chloroaniline-2,4-disulfonyl chloride dissolved in 100 ml. of dry benzene was added portionwise with stirring 31.4 grams (0.3 mole) of cyclopropanecarbonyl chloride. The resulting mixture was refluxed for 2 hours and thereafter allowed to stand overnight at room temperature. Upon the addition of pentane, the desired N-cyclopropanecarbonyl - 5 - chloroaniline-2,4-disulfonyl chloride intermediate precipitated as a crystalline solid. After recrystallization from a benzene-pentane mixture, this compound melted at 122°–123° C. and had the following analysis. Calculated for $C_{10}H_8Cl_3NO_5S_2$: C=30.59%; H = 2.05%; Cl = 27.09%. Found: C = 31.09%; H=2.53%; Cl=26.41%.

45.2 grams (0.11 mole) of N-cyclopropanecarbonyl-5-chloroaniline-2,4-disulfonyl chloride was added portionwise to 200 ml. of aqueous ammonia. The resulting solution was evaporated at room temperature and 100 ml. of water thereafter added to the viscous residue. Upon the addition of sulfuric acid, the desired N-cyclopropanecarbonyl - 5 - chloro - 2,4 - disulfamylaniline precipitated. After recrystallization from an ethyl alcohol-water mixture, this compound melted at 312°–314° C. with decomposition and analyzed as follows. Calculated for $C_{10}H_{12}ClN_3O_5S_2$: C=33.95%; H=3.42%; N=11.88%. Found: C=33.97%; H=3.46%; N=11.70%.

21.2 grams (0.06 mole) of the N-cyclopropanecarbonyl-5-chloro-2,4-disulfamylaniline prepared above was heated on an oil bath at 200° C. for 3 hours. The resulting product was then recrystallized from a dimethylformamide-water mixture to obtain 6-chloro-3-cyclopropyl-7-sulfamyl-1,2,4-benzothiadiazine-1,1-dioxide as a crystalline solid melting at 326°–327° C. with decomposition and having the following analysis. Calculated for $C_{10}H_{10}ClN_3O_4S_2$: C=35.77%; H=3.00%; N=12.51%; Cl = 10.56%; S = 19.10%. Found: C = 35.84%; H=3.19%; N=12.77%; Cl=10.88%; S=19.07%.

The 6-chloro-3-cyclopropyl-7-sulfamyl-1,2,4-benzothiadiazine-1,1-dioxide obtained above is dissolved in alcoholic sodium hydroxide and the solvent evaporated under vacuum to yield the corresponding sodium salt.

EXAMPLE 2

*6-chloro-3-cyclobutyl-7-sulfamyl-1,2,4-benzothiadiazine-1,1-dioxide*

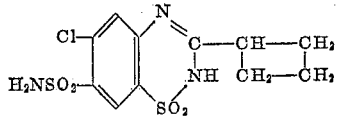

A mixture of 22.7 grams (0.07 mole) of 5-chloro-aniline-2,4-disulfonyl chloride and 16.7 grams (0.14 mole) of cyclobutanecarbonyl chloride was heated on the steam bath until a clear solution was obtained. Upon standing overnight at room temperature, N-cyclobutane-carbonyl-5-chloroaniline-2,4-disulfonyl chloride precipitated as a crystalline solid which after recrystallization from a benzene-pentane mixture melted at 114°–115° C. and analyzed as follows. Calculated for $C_{11}H_{10}Cl_3NO_5S_2$: C = 32.51%; H = 2.48%; O = 19.69%. Found: C=32.33%; H=2.77%; O=20.02%.

In the second step of the reaction, 22.2 grams (0.05 mole) of the disulfonyl chloride product prepared above was added portionwise with stirring to 125 ml. of aqueous ammonia. The resulting solution was evaporated at room temperature and 100 ml. of water thereafter added to the viscous residue. Upon the addition of concentrated hydrochloric acid to the aqueous solution, N-cyclobutyl-carbonyl-5-chloro-2,4-disulfamylaniline precipitated and was separated by filtration.

In the third step of the reaction, the disulfamylaniline intermediate was heated on an oil bath at 200° C. for 3 hours to split off water and close the ring. There was thus obtained a 6-chloro-3-cyclobutyl-7-sulfamyl-1,2,4-benzothiadiazine-1,1-dioxide product as a crystalline solid which after recrystallization from an ethanol-water mixture was found to melt at 362°–364° C. with decomposition. *Analysis.*—Calculated for $C_{11}H_{12}ClN_3O_4S_2$: C=37.77%; H=3.46%; N=12.01%; Cl=10.14%; O = 18.30%. Found: C = 38.31%; H = 3.89%; N=11.54%; Cl=10.47%; O=18.39%.

EXAMPLE 3

*6-chloro-3-(2'-methylcyclopropyl)-7-sulfamyl-1,2,4-benzothiadiazine-1,1-dioxide*

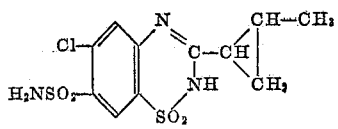

2-methylcyclopropanecarbonyl chloride (13.0 grams, 0.11 mole) was added slowly with stirring to a solution of 32.5 grams (0.1 mole) of 5-chloroaniline-2,4-disulfonyl chloride in 100 ml. of dry benzene and the resulting mixture heated on the steam bath for 30 minutes. The reaction mixture was allowed to stand overnight at room temperature before adding pentane to precipitate N-(2'-methylcyclopropanecarbonyl) - 5 - chloroaniline - 2,4-disulfonyl chloride as a crystalline solid. This product was recrystallized from a benzene-pentane mixture and was found to melt at 125°–127° C. *Analysis.*—Calculated for $C_{11}H_{10}Cl_3NO_4S_2$: N=3.59%. Found: N=3.65%.

21.5 grams (0.05 mole) of the above prepared intermediate was thereafter added portionwise to 125 ml. of aqueous ammonia and the resulting solution evaporated at room temperature. About 100 ml. of water was then added to the viscous residue followed by the dropwise addition of concentrated sulfuric acid to precipitate N-(2' - methylcyclopropanecarbonyl) - 5 - chloro - 2,4 - disulfamylaniline as a crystalline solid which after recrystallization from an ethanol-water mixture melts at 344°–345° C. with decomposition. *Analysis.*—Calculated for $C_{11}H_{14}ClN_3O_5S_2$: C = 35.91%; H = 3.84%; N = 11.42%. Found: C = 36.50%; H = 3.96%; N=11.87%.

In the final step of the method, 1.7 grams (0.005 mole) of the disulfamylaniline product prepared above was heated on a steam bath for 2 hours at 200° C. to obtain the desired 6-chloro-3-(2'-methylcyclopropyl)-7-sulfamyl-1,2,4-benzothiadiazine-1,1-dioxide as a crystalline solid which after recrystallization from methanol-water melted at 344°–345° C. *Analysis.*—Calculated for $C_{11}H_{12}ClN_3O_4S_2$: C=37.77%; H=3.46%; N=12.01%; O = 18.30%. Found: C = 38.16%; H = 3.51%; N=11.64%; O=18.32%.

In a manner similar to that described in the preceding examples, 6 - chloro-3-(2'-methylcyclobutyl)-7-sulfamyl-1,2,4-benzothiadiazine-1,1-dioxide can be prepared by the reaction of 5-chloroaniline-2,4-disulfonyl chloride with 2-methylcyclobutanecarbonyl chloride, subsequent reaction of the N-(2'-methylcyclobutanecarbonyl)5-chloroaniline-2,4-disulfonyl chloride thus formed with ammonia to yield N-(2'-methylcyclobutanecarbonyl)-5-chloro-2,4-disulfamylaniline and heating the latter compound at about 200° C. to effect ring closure. Reaction of the dioxide compound with alcoholic potassium hydroxide will produce the corresponding potassium salt.

This application is a continuation of our copending application, U.S. Serial No. 777,212, filed December 1, 1958, now abandoned.

We claim:

1. A compound selected from the class consisting of compounds corresponding to the formula

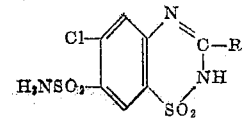

and their non-toxic alkali metal salts, wherein R is selected from the group consisting of cyclopropyl, cyclobutyl, methylcyclopropyl and methylcyclobutyl.

2. 6-chloro-3-cyclopropyl-7-sulfamyl-1,2,4-benzothiadiazine-1,1-dioxide.

3. 6 - chloro-3-cyclobutyl-7-sulfamyl-1,2,4-benzothiadiazine-1,1-dioxide.

4. 6-chloro-3-(2'-methylcyclopropyl)-7-sulfamyl-1,2,4-benzothiadiazine-1,1-dioxide.

References Cited in the file of this patent

UNITED STATES PATENTS 2,809,194    Novello _____ Oct. 8, 1957

OTHER REFERENCES

Fieser et al.: Organic Chemistry, pp. 49–50 (D. C. Heath and Co., Boston, 2nd ed., 1950).